(No Model.)
H. S. DOSH.
SOFT DOUGH MACHINE.
No. 249,227. Patented Nov. 8, 1881.
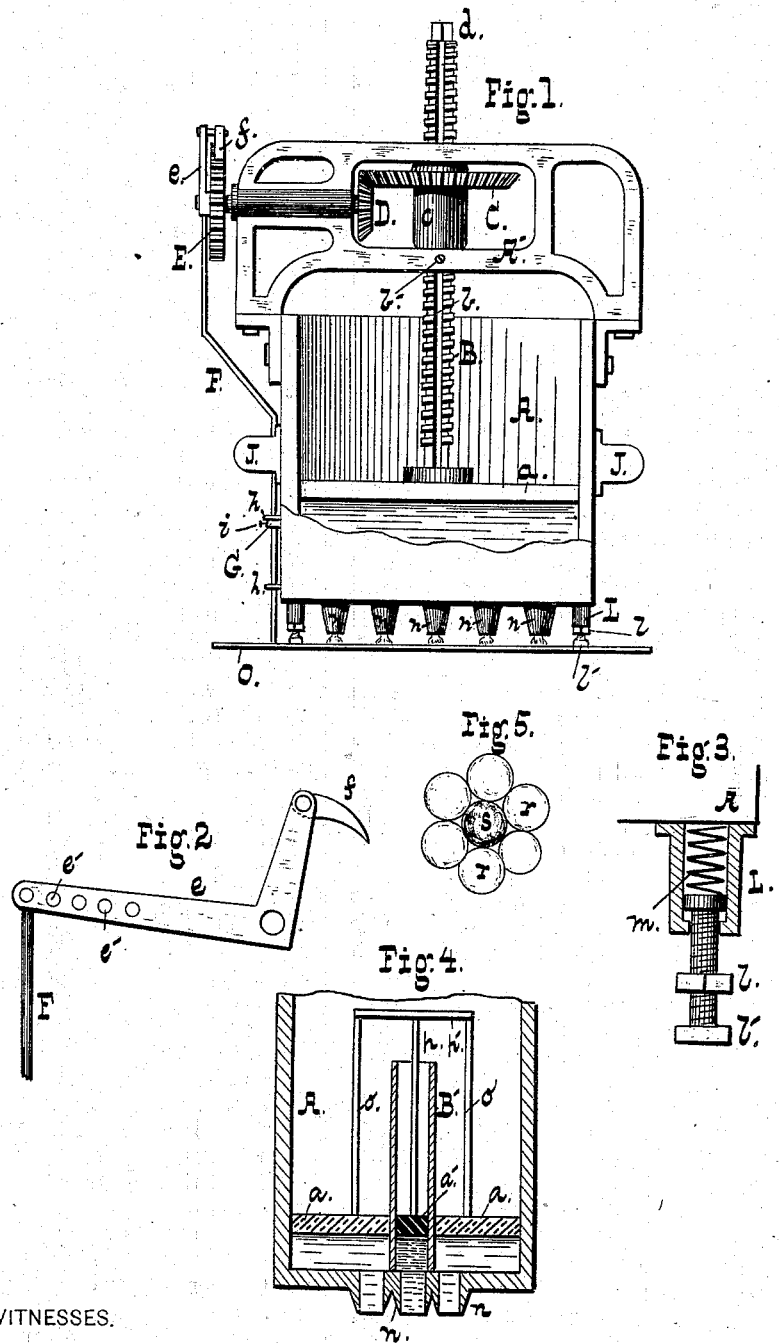

UNITED STATES PATENT OFFICE.

HENRY S. DOSH, OF BALTIMORE, MARYLAND.

SOFT-DOUGH MACHINE.

SPECIFICATION forming part of Letters Patent No. 249,227, dated November 8, 1881.

Application filed June 24, 1881. (No model.)

*To all whom it may concern:*

Be it known that I, HENRY S. DOSH, of Baltimore city, State of Maryland, have invented certain new and useful Improvements in Soft-Dough Machines; and I hereby declare the same to be fully, clearly, and exactly described as follows, reference being had to the accompanying drawings, in which—

Figure 1 is a front elevation of the machine; Fig. 2, a side elevation of the feed-lever and pawl. Fig. 3 is a sectional view of one of the supports; Fig. 4, a similar view of a modified form of dough-box. Fig. 5 is a plan of the cake produced by the latter.

My invention has reference to devices for making little cakes from what is technically known as "soft dough"—*i. e.*, dough too soft to be cleanly cut and too viscid to run.

The invention will be first described, and then pointed out in the claims.

In the drawings, A is the dough-box, having a plunger, $a$, which is driven downward by means of a screw, B, that passes through a threaded sleeve, $c$, rigidly attached to or integral with a gear-wheel, C. The latter meshes with a pinion, D, that is driven by mechanism about to be described, and both are mounted in a frame, A', bolted to the top of the box A. The latter is furnished with handles J J at either side, whereby it may be lifted, and is provided with a series of nozzles, $n\ n$, leading from its interior. There may be any desired number of these nozzles; but I have found twenty-five, disposed in five parallel rows of five each, to be a convenient number. At each corner of the box (though three will answer) is a tube, L, in which is a spiral spring, $m$, that normally presses down a plunger, $l'$, on which is mounted a nut, $l$, serving to limit the distance to which the plunger can enter the tube. The screw B has a groove, $b$, into which a screw or spring-catch, $b'$, enters, preventing the revolution of the screw B.

On the shaft of the pinion D is keyed a ratchet-wheel, E, and loosely mounted on the same shaft is a bell-crank lever, $e$, carrying at its upper end a pawl, $f$, adapted to engage with the ratchet E. The opposite arm of the lever has a number of perforations, $e'$, into one of which is fitted the end of the rod F, which passes through guides $h\ h$ on the box A, and carries between them a thimble, G, secured by a set-screw, $i$, as shown.

O is the pan upon which the cakes are placed for baking.

The upper end, $d$, of the shaft B is squared for the attachment of a crank, whereby, the catch $b'$ being released, the plunger $a$ may be quickly run up to refill the box with dough when its charge is exhausted.

In operation the box A is filled with dough, and, being held by the handles J, is brought vertically down upon the pan, against which the lower end of the rod F abuts, causing the arm of the lever to rise. The incident engagement of the pawl with the wheel E causes the latter, as well as the wheels D and C, to turn. The revolution of the latter drives down the screw B and plunger $a$ and causes the dough to flow through the nozzles $n$. The box is bodily depressed toward the pan O, causing the plungers $l'$ to enter the tubes L until the nuts $l$ abut against the under side of the tubes, when the box will be parallel with the pan, and the approximation thereto of all the nozzles will be equal. As the latter are of the same bore it is clear that precisely the same quantity of dough is forced through each, and as the box is made to approach the pan vertically the cakes are all truly circular. Upon removing the pressure upon the box the springs $m$ cause the latter to rise, and the stream of dough from each nozzle breaks. The box is then moved to another part of the pan, and the operation repeated until the pan is full, when it is removed to the oven.

While I have shown and described the device as operated by hand, it is obvious that it may be made to approach the pan, or vice versa, by machinery, and instead of moving the box over the pan the latter may be slid under the box.

Referring, now, more particularly to certain features of construction, and to the modification shown in Fig. 4, I would state that, the size of the cake being dependent upon the rate of feed of the plunger, means are afforded for regulating the same. The rod F may be brought closer to the fulcrum of the lever by fitting it into one of the inner holes, $e'$, of the latter, or the throw of the rod may be lessened by lowering the thimble G. In either case fewer teeth are passed on the return-stroke of the pawl, and the feed of the plunger is lessened.

The described construction of device makes a simple circular cake; but when it is desired to make ring-cakes or other fancy forms appropriate nozzles are inserted in the base of the box.

A form of fancy cake is shown in Fig. 5, and the modification for making it in Fig. 4. In this case the box A is provided with a tube, B′, passing through the plunger $a$, and the tube is fitted with a plunger, $a'$, that is connected with the plunger $a$ by rods $o\ p\ p'$, so that both plungers descend together. By these means the chambers beneath the plungers are isolated from each other and may contain different kinds of dough. The nozzles $n$ are arranged in such contiguity that the cakes run together, as shown in Fig. 5, and cohere, the parts $r$ being of one kind of dough and the parts $s$ of another.

It is obvious that by suitably arranging the nozzles many different designs of cake may be produced.

I do not claim the peculiar mechanism described for effecting the descent of the plunger, and any suitable and well-known device for the purpose may be used.

Having thus described my invention, what I claim as new, and desire to secure by Letters Patent, is—

1. In a soft-dough machine, a dough-box having discharge-nozzles, in combination with a series of yielding supports or feet projecting below the said nozzles, as and for the purpose set forth.

2. In combination with the box having plunger and actuating mechanism, the tubes L, springs $m$, and feet $l'$, as set forth.

3. In combination with the box having tube B′ and nozzles $n$, the connected plungers $a\ a'$, as set forth.

4. In combination with the box having plunger and actuating mechanism, the nozzles $n$, handles J, and yielding corner-supports, as set forth.

HENRY S. DOSH.

Witnesses:
R. D. WILLIAMS,
W. A. BERTRAM.